US008961731B2

(12) United States Patent
Kobayashi et al.

(10) Patent No.: US 8,961,731 B2
(45) Date of Patent: Feb. 24, 2015

(54) MANUFACTURING METHOD OF THREE-DIMENSIONAL DISPLAY DEVICE

(71) Applicant: Japan Display Inc., Tokyo (JP)

(72) Inventors: Setsuo Kobayashi, Mobara (JP); Hiroyuki Yamazaki, Chiba (JP)

(73) Assignee: Japan Display Inc., Tokyo (JP)

( * ) Notice: Subject to any disclaimer, the term of this patent is extended or adjusted under 35 U.S.C. 154(b) by 196 days.

(21) Appl. No.: 13/705,373

(22) Filed: Dec. 5, 2012

(65) Prior Publication Data

US 2013/0153117 A1 Jun. 20, 2013

(30) Foreign Application Priority Data

Dec. 19, 2011 (JP) ................................ 2011-277232

(51) Int. Cl.

| | |
|---|---|
| ***B32B 37/18*** | (2006.01) |
| ***B32B 38/18*** | (2006.01) |
| ***G02F 1/1335*** | (2006.01) |
| ***G02B 27/22*** | (2006.01) |

(52) U.S. Cl.

CPC ............. *B32B 37/18* (2013.01); *B32B 38/1841* (2013.01); *G02F 1/133512* (2013.01); *G02B 27/2214* (2013.01)

USPC ...................................................... 156/272.2

(58) Field of Classification Search

CPC ......... B32B 37/18; G02F 1/13; G02F 1/1335; H04N 13/04; G02B 27/22

USPC ................................................ 156/67, 272.2

See application file for complete search history.

(56) References Cited

U.S. PATENT DOCUMENTS

2006/0051109 A1* 3/2006 Lim et al. ....................... 399/22

FOREIGN PATENT DOCUMENTS

| | | |
|---|---|---|
| JP | 3-119889 | 5/1991 |
| JP | 2006-79097 A | 3/2006 |
| JP | 2009-524098 A | 6/2009 |
| WO | 2007/083925 A1 | 7/2007 |

OTHER PUBLICATIONS

Office Action issued in counterpart Japanese Patent Application 2011-277232; dated May 7, 2014; 3 pages, along with 3-page partial English-language translation.

* cited by examiner

*Primary Examiner* — Daniel McNally
(74) *Attorney, Agent, or Firm* — Ulmer & Berne LLP

(57) ABSTRACT

In a three-dimensional image display device using a liquid crystal parallax barrier panel, a liquid crystal display panel is first roughly aligned with the liquid crystal parallax barrier panel using an alignment mark. Subsequently, a white pattern for two pixels is formed in the center of a screen. When an observer's eyes are brought close to the screen, a blue pattern is generated in the center, and a white pattern is generated on both sides of the blue pattern. The relationship between a width d1 of the blue pattern and a width d2 of the white pattern is d1=2d2, and the tilt of the blue pattern is set in a predetermined range, so that necessary alignment accuracy can be secured.

9 Claims, 11 Drawing Sheets

PREPARE LIQUID CRYSTAL DISPLAY PANEL

PREPARE LIQUID CRYSTAL PARALLAX BARRIER PANEL

APPLY UV CURABLE RESIN

ROUGHLY ALIGN LIQUID CRYSTAL DISPLAY PANEL WITH LIQUID CRYSTAL PARALLAX BARRIER PANEL USING ALIGNMENT MARK

CORRECTLY ALIGN LIQUID CRYSTAL DISPLAY PANEL WITH LIQUID CRYSTAL PARALLAX BARRIER PANEL USING BARRIER PATTERN

CURE BONDING RESIN BY APPLYING UV RAY 20
1002
1002
1002

10
1001
1001
1001

θ
1
100
L
L2
L2
100
100

MANUFACTURING METHOD OF THREE-DIMENSIONAL DISPLAY DEVICE

CLAIM OF PRIORITY

The present application claims priority from Japanese Patent Application JP 2011-277232 filed on Dec. 19, 2011, the content of which is hereby incorporated by reference into this application.

BACKGROUND OF THE INVENTION

1. Field of the Invention

The present invention relates to a display device, and more particularly to a three-dimensional display device using a liquid crystal parallax barrier panel.

2. Description of the Related Art

For a method of displaying a three-dimensional image with no use of eyeglasses, a parallax barrier method is known. The parallax barrier method is a method of displaying a three-dimensional image in which an image in the field of view from the right eye and an image in the field of view from the left eye are vertically cut in strips and alternately arranged to form an image, the image is placed on the rear side of a plate with narrow vertical slits, which is called a parallax barrier panel, and the image is displayed three-dimensionally through the parallax barrier panel.

Japanese Unexamined Patent Application Publication No. Hei 3-119889 describes the configuration of a three-dimensional display device in which a parallax barrier panel is formed using liquid crystals for enabling both of a two-dimensional image display and a three-dimensional image display. Japanese Patent Application Publication (Translation of PCT Application) No. 2009-524098 describes a technique for a three-dimensional display device using a parallax barrier in which a parallax barrier panel is aligned with a liquid crystal display panel while observing a left eye image and a right eye image with no use of alignment marks.

SUMMARY OF THE INVENTION

A parallax barrier panel using liquid crystals (in the following, referred to as a liquid crystal parallax barrier panel 20) has advantages that a two-dimensional image and a three-dimensional image can be easily switched as necessary. On the other hand, in three-dimensional display devices according to the parallax barrier method, not limited to liquid crystal parallax barrier panels, it is necessary to accurately align a liquid crystal display panel with a parallax barrier panel.

Conventionally, a liquid crystal display panel is aligned with the parallax barrier panel 20 using alignment marks as illustrated in FIG. 14. FIG. 14 is a plan view of a three-dimensional display device 1 in which the liquid crystal parallax barrier panel 20 is disposed on a liquid crystal display panel 10. FIG. 15 is a cross sectional view along a line D-D in FIG. 14. In FIGS. 14 and 15, the liquid crystal parallax barrier panel 20 is disposed on the liquid crystal display panel 10, and an upper polarizer 33 is disposed on the topmost surface of the liquid crystal parallax barrier panel 20. The liquid crystal display panel 10 is configured of a TFT substrate 11 on which pixels are arranged in a matrix configuration and a color filter substrate 12 on which color filters are arranged as corresponding to the pixels. The TFT substrate 11 is formed larger than a counter substrate 21 or the liquid crystal parallax barrier panel 20. The TFT substrate 11 has a portion larger than the other substrates, and the portion is formed with an IC driver, not illustrated, and wires to connect to an IC driver or a flexible wiring board, not illustrated.

In FIGS. 14 and 15, an alignment mark 100 (alignment marks 1001 and 1002) is formed at both ends of a terminal portion 15 of the liquid crystal parallax barrier panel 20 or the liquid crystal display panel 10, and the alignment marks are used to align the liquid crystal display panel 10 with the liquid crystal parallax barrier panel 20.

In FIG. 15, the liquid crystal display panel 10 and the liquid crystal parallax barrier panel 20 are stacked on a backlight BL. A lower polarizer 31, the TFT substrate 11, a liquid crystal layer 40, and the color filter substrate 12 are disposed on the liquid crystal display panel 10 from the under side. The liquid crystal layer 40 is sealed with sealing materials 13 formed around the TFT substrate 11 and the counter substrate 21. A middle polarizer 32 is disposed on the color filter substrate 12. In a typical liquid crystal display panel 10, the middle polarizer 32 is an upper polarizer. The liquid crystal display panel 10 is configured of these components.

The middle polarizer 32 also serves as the lower polarizer of the liquid crystal parallax barrier panel 20. The liquid crystal parallax barrier panel 20 is disposed on the liquid crystal display panel 10, and configured from the middle polarizer 32 to the upper polarizer 33. The counter substrate 21 is formed on the middle polarizer 32, and a counter electrode is formed all over the surface of the counter substrate 21, for example. A barrier substrate 22 is disposed on the counter substrate 21. The liquid crystal layer 40 is disposed between the barrier substrate 22 and the counter substrate 21, and the liquid crystal layer 40 is sealed with the sealing materials 13 formed around the barrier substrate 22 and the counter substrate 21.

In FIG. 15, the alignment mark 1001 of the liquid crystal display panel 10 is formed on the TFT substrate 11, and the alignment mark 1002 of the liquid crystal parallax barrier panel 20 is formed on the barrier substrate 22. The TFT substrate 11 and the barrier substrate 22 are subjected to lithography processes for the other electrode layers, and the alignment mark 100 can be formed together with the other electrode layers at the same time.

FIG. 16A illustrates the shape of the barrier substrate alignment mark 1002 of the liquid crystal parallax barrier panel 20. This barrier substrate alignment mark 1002 has a shape in which four quadrilaterals are arranged and spaced. FIG. 16B illustrates the TFT substrate alignment mark 1001 of the liquid crystal display panel 10. The TFT substrate alignment mark 1001 has a cross shape.

FIG. 16C is the state of the alignment mark 100 in which the alignment of the liquid crystal display panel 10 with the liquid crystal parallax barrier panel 20 is completed. In this state, the cross TFT substrate alignment mark 1001 and the quadrilateral barrier substrate alignment mark 1002 are arranged as the quadrilaterals of the barrier substrate alignment mark 1002 are spaced from the cross TFT substrate alignment mark 1001. A gap L2 between the cross alignment mark 1001 and the quadrilaterals of the alignment mark 1002 has a certain value, and then alignment is completed. In this connection, the accuracy of the gap L2 between the cross alignment mark and the quadrilaterals of the quadrilateral alignment mark is ±0.015 mm in the alignment mark 100. However, since accuracy of ±0.015 mm is not enough, the target accuracy is ±0.007 mm, which has not been actually achieved yet.

Now again referring to FIG. 16C, when the alignment accuracy of the liquid crystal parallax barrier panel 20 with the liquid crystal display panel 10 is not enough, a θ shift becomes conspicuous in FIG. 16C. Namely, the alignment mark 100 in FIG. 16C can align dimensions in the x direction and the y direction as well as can match the value of θ at the same time. However, when the dimension of the gap L2 in FIG. 16C is not aligned sufficiently, a θ component error remains.

In the case where alignment is insufficient and the θ component remains in FIG. 16C, in the upper part of a screen 500, for example, an error of Lθ occurs between the liquid crystal display panel 10 and the liquid crystal parallax barrier panel 20, and an alignment error between the scanning line or the video signal line of the liquid crystal display panel 10 and the barrier pattern of the liquid crystal parallax barrier panel 20 causes a problem such as the occurrence of moiré. As illustrated in FIG. 16C, this error is proportional to an angle error θ and a distance L from the position of the alignment mark 100 to the top end of the liquid crystal parallax barrier panel 20 or the liquid crystal display panel 10. It is difficult to easily improve the alignment accuracy of the alignment mark 100.

On the other hand, it is difficult to dispose the alignment marks 100 at given locations particularly from the demand of wiring on the liquid crystal display panel 10. As illustrated in FIG. 14, it is necessary to dispose the alignment marks 100 at locations close to the terminal portion 15. When the alignment marks 100 are disposed at locations close to the terminal portion 15, the value of L in FIG. 14 becomes larger, and the influence of Lθ due to the θ shift becomes greater in alignment using the alignment marks 100. Therefore, conventionally, the influence due to the θ shift in alignment causes moiré, for example, and image quality is degraded.

The following is another problem in the conventional example. Namely, in bonding the liquid crystal display panel 10 to the liquid crystal parallax barrier panel 20 in the conventional method, displacement often occurs in the portion on the opposite side of the terminal portion 15. As illustrated in FIG. 17, it is necessary to make the display region of the liquid crystal display panel 10 larger than the parallax barrier forming region in order to display all of pixels 70 even though displacement occurs. In FIG. 17, a display region LCDD of the liquid crystal display panel 10 is larger than a barrier forming region PBD of the parallax barrier panel. This configuration is disadvantageous in the three-dimensional display device 1, particularly in the case where it is desired to reduce the outer side of the display region, that is, a picture frame portion.

Still another problem in the conventional technique is the process of the alignment mark 100 itself. The distance between the TFT substrate alignment mark 1001 on the TFT substrate 11 and the barrier substrate alignment mark 1002 on the barrier substrate 22 is about 0.53 mm, for example, even though the layer thickness of liquid crystals is ignored. Namely, suppose that the thickness of the counter substrate 21 of the liquid crystal parallax barrier panel 20 is 0.2 mm, the thickness of the color filter substrate 12 of the liquid crystal display panel 10 is 0.2 mm, and the thickness of the middle polarizer 32 is about 0.13 mm, the total thickness is about 0.53 mm.

When the alignment marks 100 vertically apart from each other are imaged using a single camera, the shapes of the alignment marks 100 blur because of the influence of the depth of focus. When the alignment marks 100 blur, the alignment accuracy of the liquid crystal display panel 10 with the liquid crystal parallax barrier panel 20 using the alignment marks 100 is degraded. In order to prevent the degradation, it is necessary to separately provide a camera for the alignment mark 1002 formed on the barrier substrate 22 and a camera for the alignment mark 1001 formed on the TFT substrate 11, and four cameras are necessary in total for the alignment marks 100 at two locations. The necessity of four cameras in total and control circuits for the cameras increases the costs of facilities. As a result, the costs of the three-dimensional display device 1 are increased.

It is an object of the present invention to prevent is the degradation of image quality caused by moiré or the like by reducing errors in aligning the liquid crystal display panel 10 with the liquid crystal parallax barrier panel 20. Moreover, it is another object of the present invention to make the display region of the liquid crystal display panel 10 equal to the forming region of the liquid crystal parallax barrier panel 20, to reduce the picture frame of the three-dimensional display device 1, and to increase a ratio between the display region and the outer shape by reducing errors in aligning the liquid crystal display panel 10 with the liquid crystal parallax barrier panel 20.

Furthermore, it is still another object of the present invention to reduce the costs of manufacturing devices for aligning the liquid crystal display panel 10 with the liquid crystal parallax barrier panel 20, and to reduce the manufacturing costs of the three-dimensional display device 1.

The present invention is to solve the problems above. The following is specific methods.

(1) There is provided a manufacturing method of a three-dimensional display device in which a liquid crystal parallax barrier panel is stacked on a display region liquid crystal display panel, the display region liquid crystal display panel having a pixel formed of three sub-pixels arranged in a lateral direction of a screen at a pixel pitch P, and the liquid crystal parallax barrier panel sandwiching liquid crystals between a barrier substrate formed with a barrier electrode and a counter substrate formed with a counter electrode, the method including the steps of: aligning the liquid crystal display panel with the liquid crystal parallax barrier panel using an alignment mark formed on the liquid crystal display panel and an alignment mark formed on the liquid crystal parallax barrier panel as a first step; aligning the liquid crystal display panel with the liquid crystal parallax barrier panel as a second step in which a signal forming a white pattern in a width of two pixels on the liquid crystal display panel is inputted, at a location at which the white pattern has a color pattern having a color different from a color of a center white pattern or black pattern and a white pattern is formed on both sides of the color pattern different from the white pattern or black pattern in bringing an observer's eyes close to the screen, according to relationship between a width d1 of the color pattern different from the white pattern or black pattern and a width d2 of the white pattern formed on the both sides of the width of the color pattern different from the white pattern or black pattern and a tilt of the color pattern different from the white pattern or black pattern with respect to the screen; and after the alignment, finally fixing the liquid crystal display panel to the liquid crystal parallax barrier panel.

(2) In the manufacturing method of a three-dimensional display device according to (1), the relationship between the width d1 of the color pattern different from the white pattern or black pattern and the width d2 of the white pattern formed on the both sides of the color pattern different from the white pattern or black pattern is d1=2d2.

(3) In the manufacturing method of a three-dimensional display device according to (1), the color of the color pattern different from the white pattern or black pattern is blue.

(4) There is provided a manufacturing method of a three-dimensional display device in which a liquid crystal parallax barrier panel is stacked on a display region liquid crystal display panel, the display region liquid crystal display panel having a pixel formed of three sub-pixels in a lateral direction of a screen at a pixel pitch P, the liquid crystal parallax barrier panel sandwiching liquid crystals between a barrier substrate formed with a barrier electrode and a counter substrate formed with a counter electrode, and the three-dimensional display device enabling vertical display in which the screen is put in a first direction and lateral display in which the screen is put in a second direction, the method including the steps of: forming an electrode for putting the screen in the first direction and an electrode for putting the screen in the second direction on the liquid crystal parallax barrier panel; aligning the liquid crystal display panel with the liquid crystal parallax barrier panel as a first step in which a signal forming a white pattern in a width of two pixels on the liquid crystal display panel is inputted in the first direction in which the screen is put, at a location at which the white pattern has a color pattern having a color different from a color of a center white pattern or black pattern and a white pattern is formed on both sides of the color pattern different from the white pattern or black pattern in bringing an observer's eyes close to the screen, according to relationship between a width d1 of the color pattern different from the white pattern or black pattern and a width d2 of the white pattern formed on the both sides of the color pattern different from the white pattern or black pattern and a tilt of the color pattern different from the white pattern or black pattern with respect to the screen; aligning the liquid crystal display panel with the liquid crystal parallax barrier panel as a second step in which a signal forming a white pattern in a width of two pixels on the liquid crystal display panel is inputted in the second direction, at a location at which the white pattern has a color pattern having a color different from a color of a center white pattern or black pattern and a white pattern formed on both sides of a color pattern different from the white pattern or black pattern is formed in bringing an observer's eyes close to a screen, according to relationship between a width d1 of the color pattern different from the white pattern or black pattern and a width d2 of the white pattern formed on the both sides of the color pattern different from the white pattern or black pattern and a tilt of the color pattern different from the white pattern or black pattern with respect to the screen; and after the alignment, finally fixing the liquid crystal display panel to the liquid crystal parallax barrier panel.

According to the present invention, in a three-dimensional display device using a parallax barrier, a liquid crystal display panel can be accurately aligned with a liquid crystal parallax barrier panel, so that it is possible to prevent the occurrence of moiré or the like in the three-dimensional display device. Moreover, according to the present invention, a liquid crystal display panel can be aligned with a liquid crystal parallax barrier panel using only one alignment mark with a single camera for use in alignment, so that it is possible to suppress the costs of manufacturing devices for alignment, and thus it is possible to reduce the costs of a three-dimensional display device.

Furthermore, also in the case where a screen is put vertically or laterally, in a device that can display images three-dimensionally also using a parallax barrier, it is possible to accurately bond a liquid crystal display panel to a liquid crystal parallax barrier panel with no alignment marks.

DETAILED DESCRIPTION OF THE PREFERRED EMBODIMENTS

In the following, the present invention will be described in detail with reference to embodiments.

First Embodiment

Figure 1:
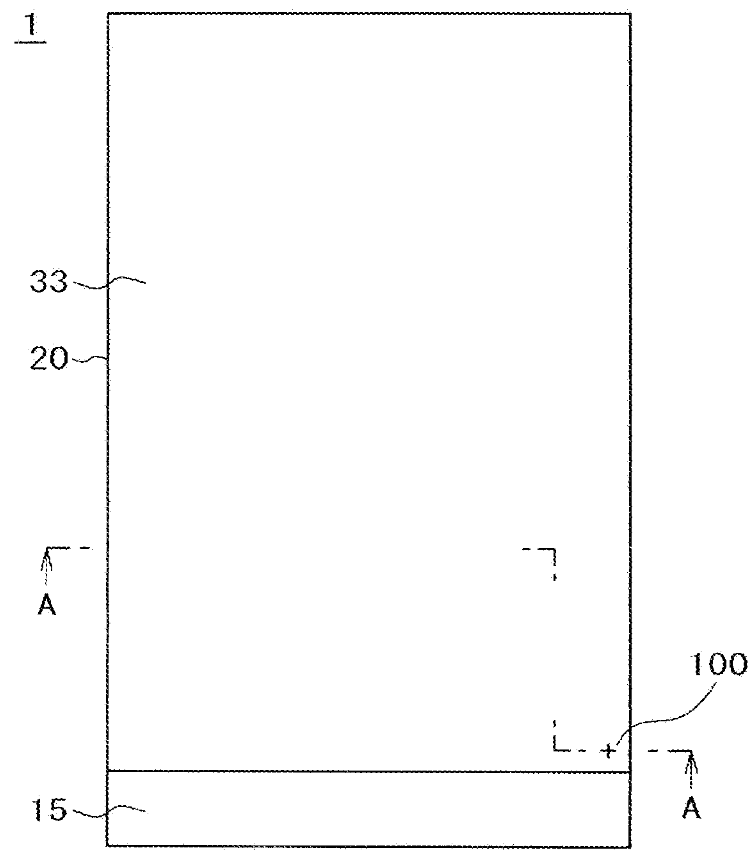
FIG. 1 is a plan view of a three-dimensional display device according to a first embodiment.
Figure 2:
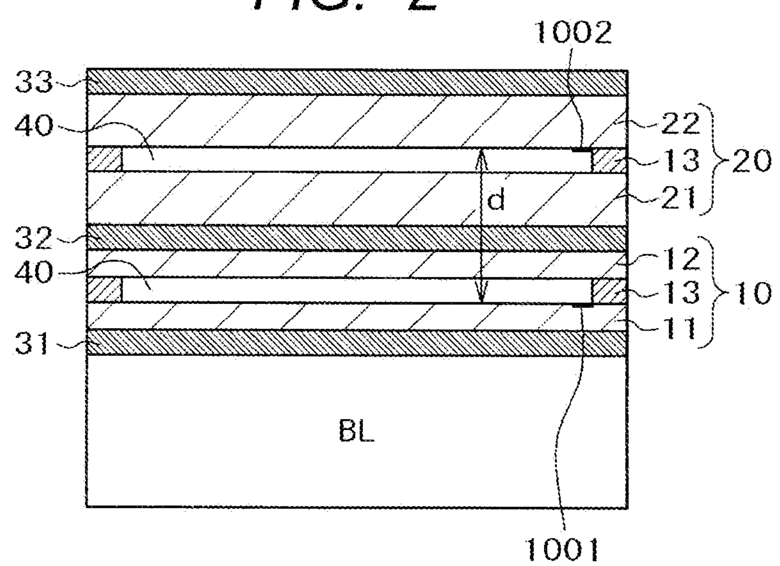
FIG. 2 is a cross sectional view along a line A-A in FIG. 1.

FIG. 1 is a plan view of a three-dimensional display device according to the present invention. FIG. 2 is a cross sectional view along a line A-A in FIG. 1. In FIGS. 1 and 2, the three-dimensional display device has a liquid crystal parallax barrier panel 20 stacked on a liquid crystal display panel 10. An upper polarizer 33 for the liquid crystal parallax barrier panel 20 is disposed on the topmost layer of the liquid crystal parallax barrier panel 20. Moreover, a TFT substrate 11 is formed with a terminal portion 15. These components and configurations are described in FIG. 14, and the detailed descriptions are omitted. In FIG. 1, only one alignment mark is provided. It is noted that a single alignment mark means a pair of a barrier substrate alignment mark 1002 formed on a barrier substrate 22 and a TFT substrate alignment mark 1001 formed on the TFT substrate 11.

Figure 12:
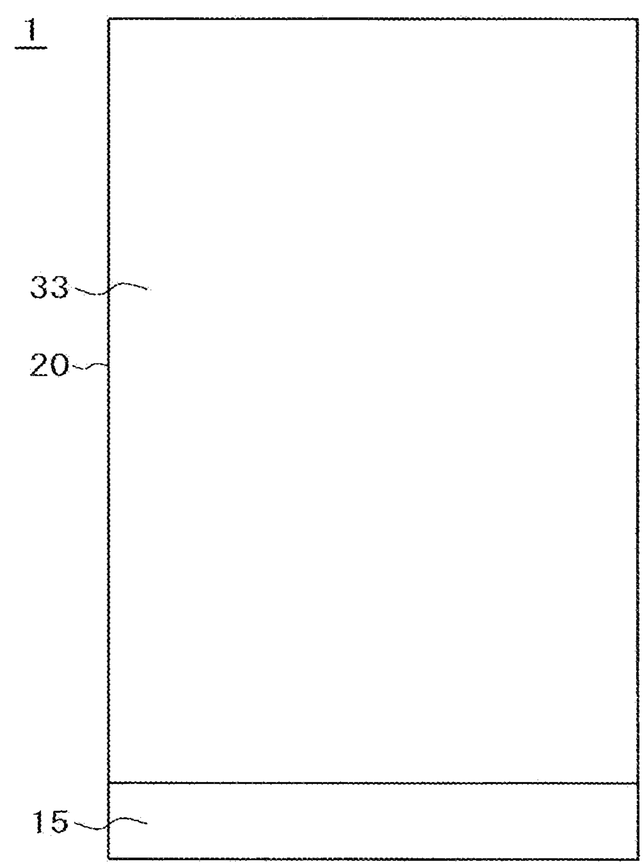
FIG. 12 is a plan view of a three-dimensional display device according to the second embodiment.

The structure in FIG. 2 is basically the same as the structure described in FIG. 12, and the detailed descriptions are omitted. In FIG. 2, the alignment mark is on the right end portion of the screen. A distance d between the TFT substrate alignment mark 1001 of the liquid crystal display panel 10 and the barrier substrate alignment mark 1002 of the liquid crystal parallax barrier panel 20 is 0.53 mm, the same as the distance in FIG. 12, for example. However, the distance d is not limited to this distance.

Figure 3:
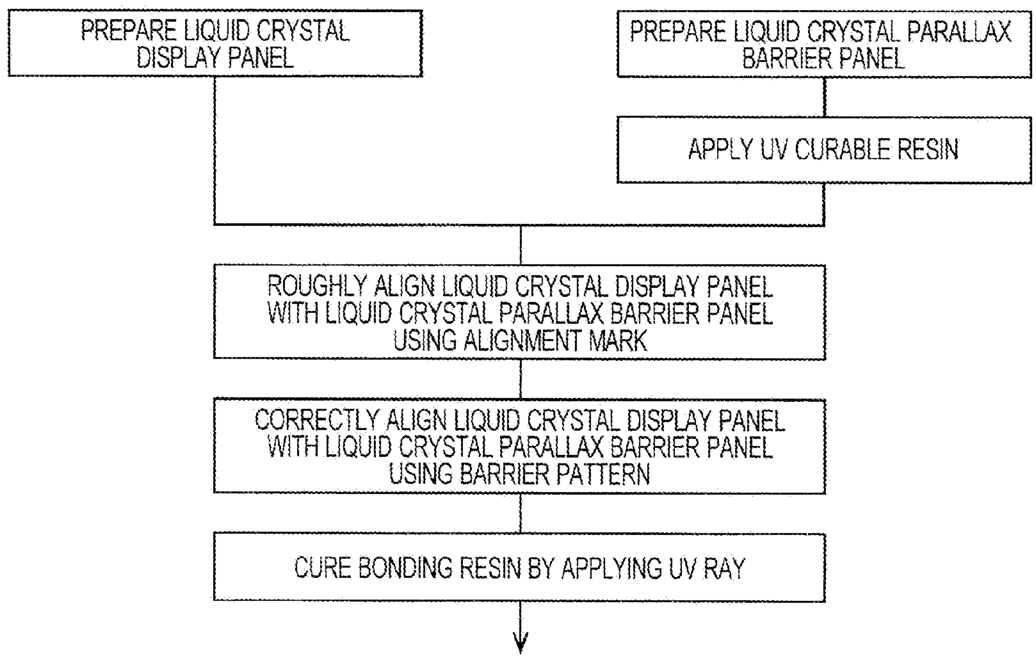
FIG. 3 is a flowchart of the process step of bonding a liquid crystal display panel to a liquid crystal parallax barrier panel according to the first embodiment.

FIG. 3 is a flowchart of the process step of bonding the liquid crystal display panel to the liquid crystal parallax barrier panel according to the embodiment. In FIG. 3, the liquid crystal display panel and the liquid crystal parallax barrier panel are prepared separately. A UV curable resin is applied on the lower surface of the liquid crystal parallax barrier panel for bonding the liquid crystal display panel. In this case, a middle polarizer is bonded to the color filter substrate of the liquid crystal display panel. It is noted that such a configuration may be possible in which the middle polarizer is bonded to the lower surface of the liquid crystal parallax barrier panel and a UV curable resin is applied to the color filter substrate of the liquid crystal display panel.

After applying the UV curable resin, the alignment marks formed at the lower right in FIG. 1 are used to roughly align the liquid crystal display panel with the liquid crystal parallax barrier panel. In the present invention, the alignment marks for bonding the liquid crystal display panel to the liquid crystal parallax barrier panel are used as auxiliary marks for bonding, that is, alignment marks in a preparing step. In other words, it is unnecessary to accurately align the liquid crystal display panel with the liquid crystal parallax barrier panel using the alignment marks as in the conventional method. In other words, blurs caused by the influence of the depth of focus can also be permitted. Therefore, as illustrated in FIG. 2, even though the barrier substrate alignment mark is apart from the TFT substrate alignment mark by a distance of about 0.53 mm, data measured with a single camera can be used.

After roughly aligning the panels, the liquid crystal display panel and the liquid crystal parallax barrier panel are lit, and the barrier pattern is used to align the panels in the x direction and the θ direction in the screen center part of the three-dimensional display device for accurately aligning the liquid crystal display panel with the liquid crystal parallax barrier panel. After accurately aligning the panels, UV rays are applied to cure the UV curable resin, and the liquid crystal display panel is bonded to the liquid crystal parallax barrier panel.

Figure 4:
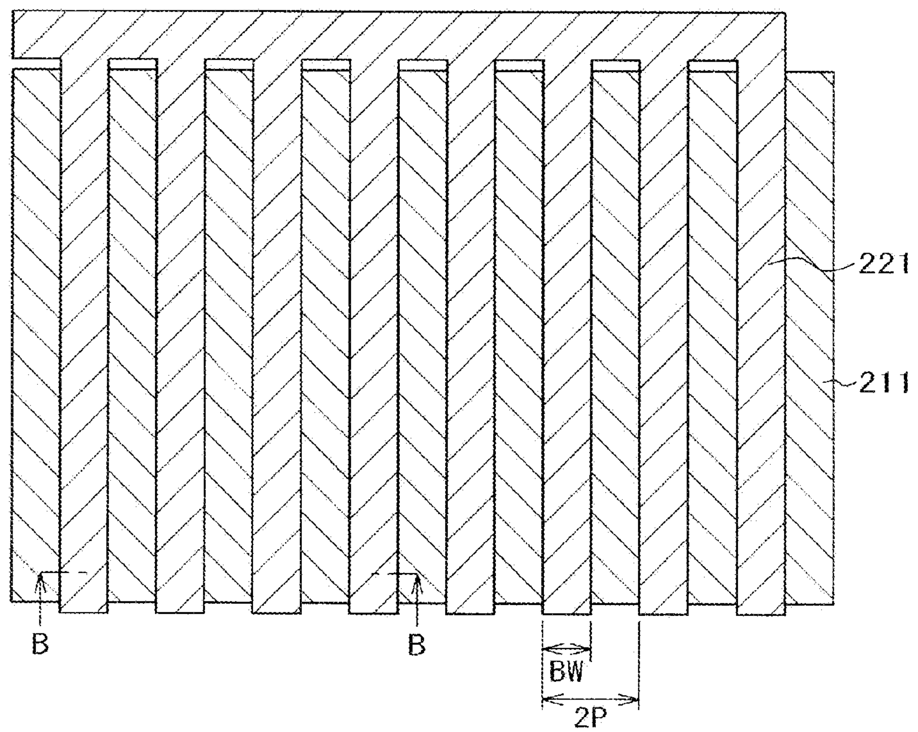
FIG. 4 is a plan view of the relationship between a barrier electrode and a counter electrode of the liquid crystal parallax barrier panel.
Figure 9:
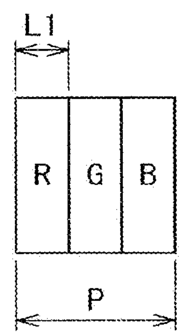
FIG. 9 is a plan view of a pixel structure.

FIG. 4 is a plan view in which barrier electrodes formed on the barrier substrate are laid over a counter electrode formed on a counter substrate of the liquid crystal parallax barrier panel and the electrodes are seen from above. In FIG. 4, the stripe barrier electrodes extend in the vertical direction, and arranged in the lateral direction. One ends of the barrier electrodes are electrically connected to each other. The pitch between the barrier electrodes is twice a lateral dimension P of a pixel illustrated in FIG. 9. On the other hand, a width BW of the barrier electrode is the same as the lateral dimension P of the pixel. The counter electrode is formed all over the surface.

Figure 5:
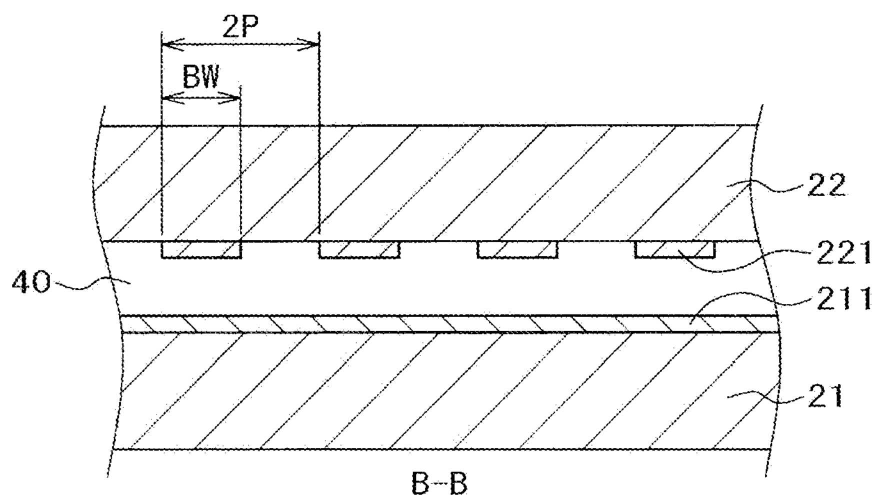
FIG. 5 is a cross sectional view along a line B-B in FIG. 4.

FIG. 5 is a cross sectional view of the liquid crystal parallax barrier panel corresponding to the cross section along the line B-B in FIG. 4. In FIG. 5, the barrier substrate is formed with the barrier electrodes in the width BW at a pitch of 2P. The counter electrode is formed all over the surface of the counter substrate. Light from a backlight is uniformly transmitted when no voltage is applied across the barrier electrodes and the counter substrate. The three-dimensional display device in this case is used as a two-dimensional display device.

When a voltage is applied across the barrier electrodes and the counter electrode, light from the backlight is blocked at the barrier electrodes, and a stripe barrier pattern is formed. The stripe barrier pattern enables three-dimensional display using parallax.

Figure 6:
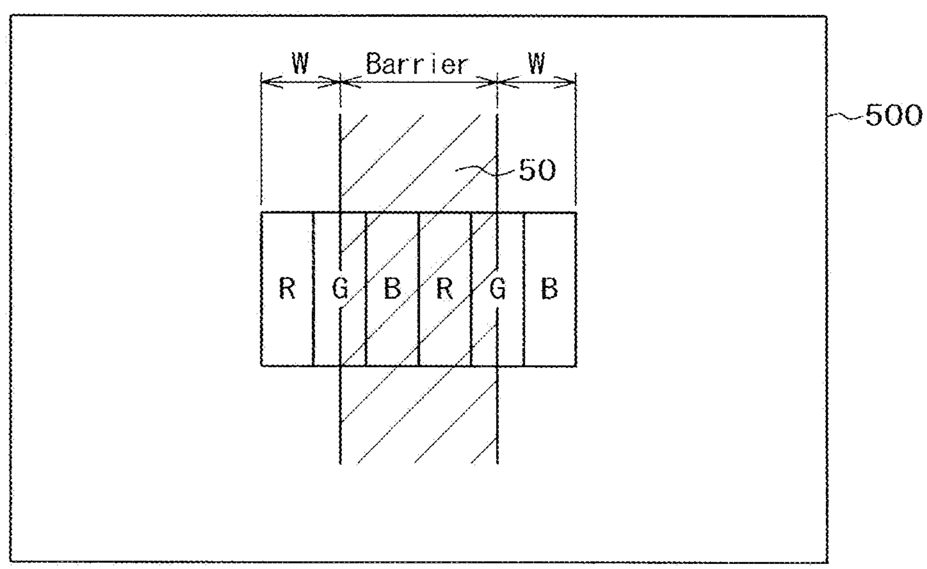
FIG. 6 is a diagram of the relationship between a barrier pattern and a white pattern in the case where the white pattern is displayed in a width of two pixels in the center of a screen and seen normally from an observer's eyes.

FIG. 6 is an enlarged diagram of the relationship between two pixels and the barrier pattern when a white stripe in a width of two pixels is vertically displayed in the screen center part of the three-dimensional display device. In FIG. 6, a red sub-pixel R, a green sub-pixel G, and a blue sub-pixel B are laterally arranged to form a pixel. It is noted that in the present specification, the pixel is sometimes referred to as a picture element, and the sub-pixel is sometimes referred to as a sub-picture element. The pixel in FIG. 6 has a square shape. The pixels are continuously formed in the vertical direction and the lateral direction. In FIG. 6, only two pixels in the screen center part are depicted.

In FIG. 6, the barrier pattern covers a single pixel. The barrier pattern completely covers the blue sub-pixel B and the red sub-pixel R, and covers a half of the green sub-pixel G on both sides. In FIG. 6, when cameras are placed at the positions of eyes for using the parallax of human eyes in the screen center part as white display for two pixels for observation, the barrier pattern portion is a black pattern, and portions on both sides of the black pattern are white patterns. These patterns are similarly observed when the pixels are observed by human eyes.

Figure 7:
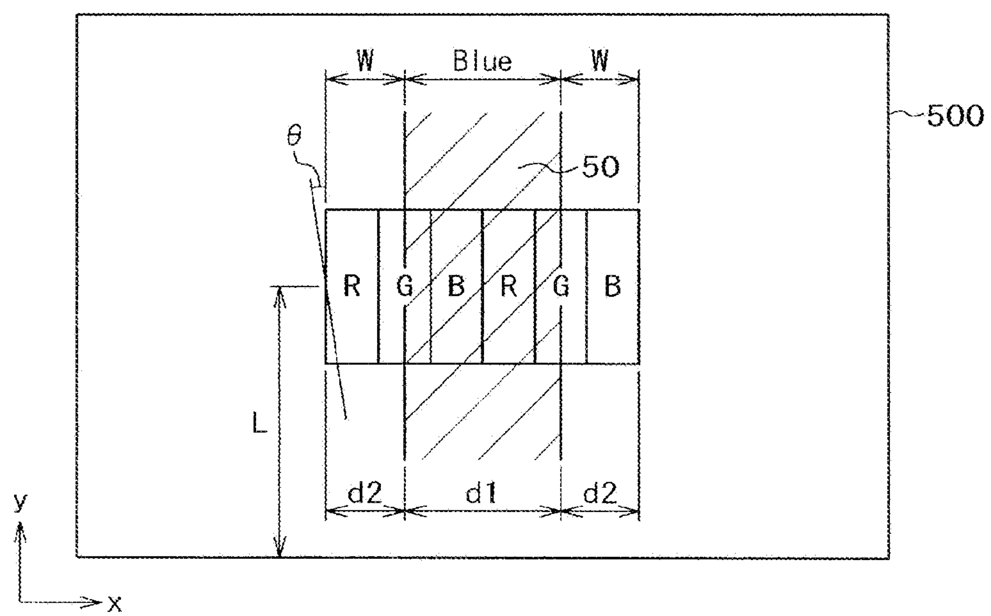
FIG. 7 is a plan view of a barrier pattern portion whose color is changed to blue in the case where the observer's eyes are brought close to the screen in the configuration in FIG. 6.

FIG. 7 is a plan view of patterns in the case where the positions of human eyes are brought close to the screen. In FIG. 7, the barrier pattern portion is originally a black pattern, but the portion soon looks a blue pattern. The portions on both sides of the blue pattern are then white patterns. FIG. 7 is the case where the portion corresponding to the barrier pattern is a blue pattern. However, a color pattern other than a blue pattern sometimes appears. Namely, a color pattern other than a white or black pattern sometimes appears. In the following description, the case of a blue pattern will be described.

In FIG. 7, the width of the blue pattern is d1, and the width of the white patterns on both sides is d2. When d1=2d2 is achieved, the positions in the lateral direction, that is, the positions in the x direction in FIG. 7 are accurately set between the liquid crystal display panel and the liquid crystal parallax barrier panel. Namely, alignment in the x direction is achieved. On the other hand, in FIG. 7, when the blue pattern in the center and the white patterns on both sides are not tilted when visually seen, displacement in the θ direction does not exist.

It is noted that in the description above, the relationship d1=2d2 is one example in the case where the width of the blue pattern is d1 and the width of the white patterns on both sides is d2. In the case where the positions of the observer's eyes are different and the width of the barrier pattern is different from the width of the pixel, for example, this equation is not always held. In short, since the relationship between d1 and d2 is different depending on the designs of the liquid crystal display panel and the liquid crystal parallax barrier panel, the widths d1 and d2 can be set for individual product types.

Figure 14:
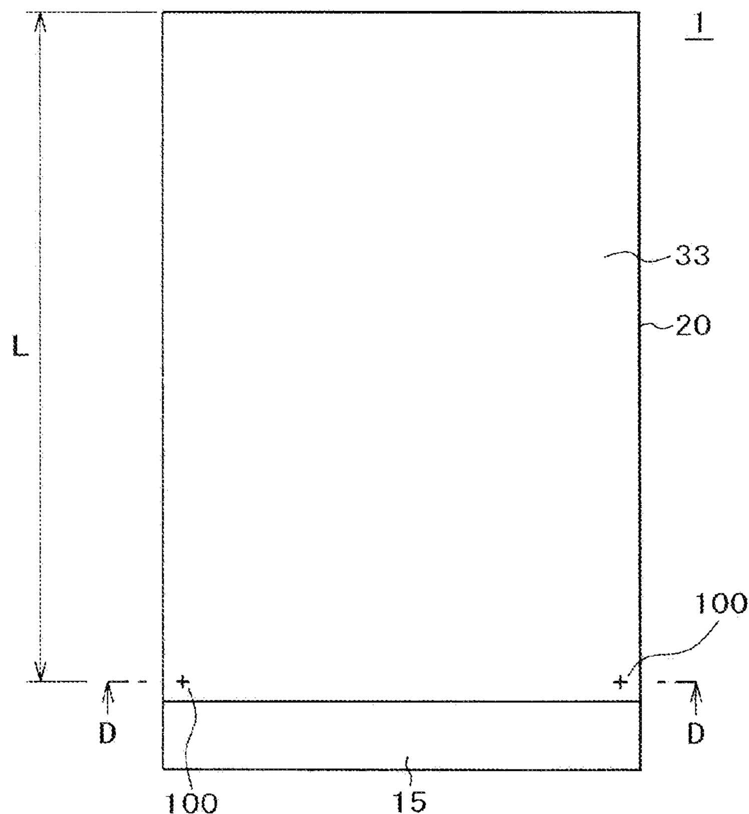
FIG. 14 is a plan view of a three-dimensional display device of the second embodiment according to a conventional example.
Figure 15:
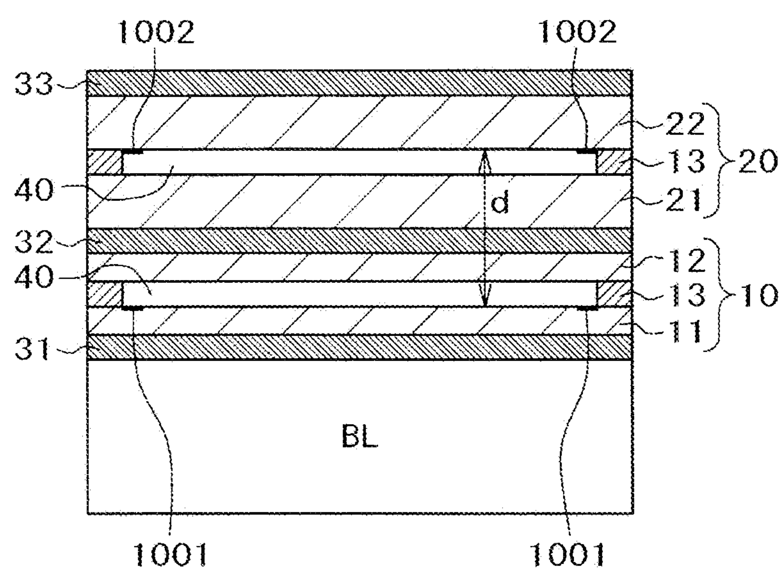
FIG. 15 is a cross sectional view along a line D-D in FIG. 14.

Namely, this method can bond the liquid crystal display panel to the liquid crystal parallax barrier panel with no use of alignment marks in such a way that the actual display patterns are used to eliminate displacement in the lateral direction (in the x direction) and displacement in the θ direction. In the present invention, alignment is adjusted in the θ direction in the screen center part, so that bonding errors can be reduced even though displacement within tolerance occurs in the θ direction. Namely, in FIG. 7, in the case where displacement occurs in the θ direction, an error in the lower part or the upper part of the screen, which is the part being the most affected by the displacement in the θ direction, is Lθ. In the present invention, since the length of L is a half of the length in FIG. 14 illustrating the conventional example, the displacement Lθ in the θ direction can be a half of the conventional displacement.

Figure 8A:
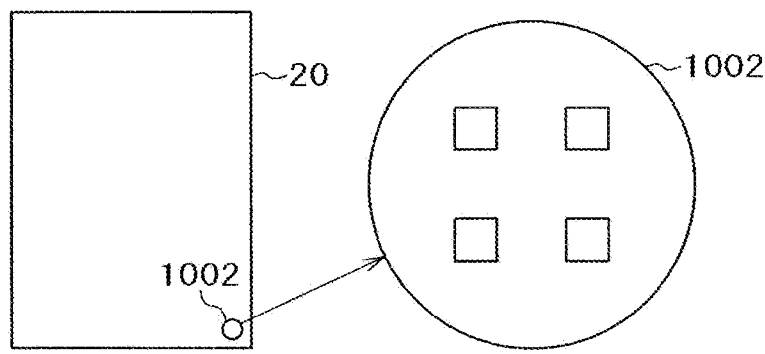
FIGS. 8A to 8C are diagrams of alignment marks according to the first embodiment.
Figure 8B:
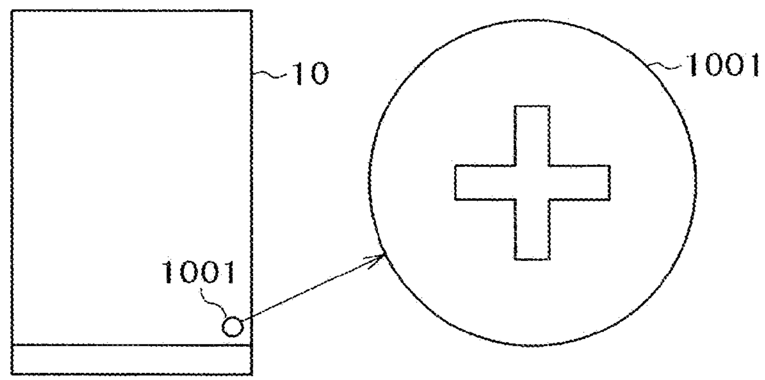
Figure 8C:
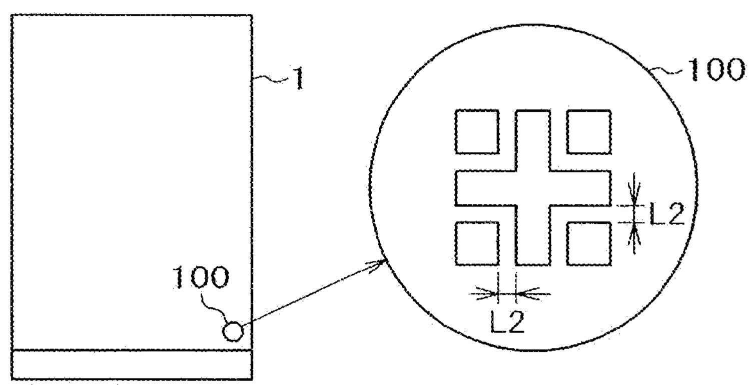

In FIG. 7, the directions in which the liquid crystal display panel can be accurately aligned with the liquid crystal parallax barrier panel are the x direction and the θ direction illustrated in FIG. 7. In the method in FIG. 7 it is difficult to achieve alignment in the y direction. Therefore, alignment in the y direction can be achieved using alignment marks as illustrated in FIGS. 8A to 8C. In FIGS. 8A to 8C, the alignment mark is placed at one location different from the conventional example.

Figure 16A:
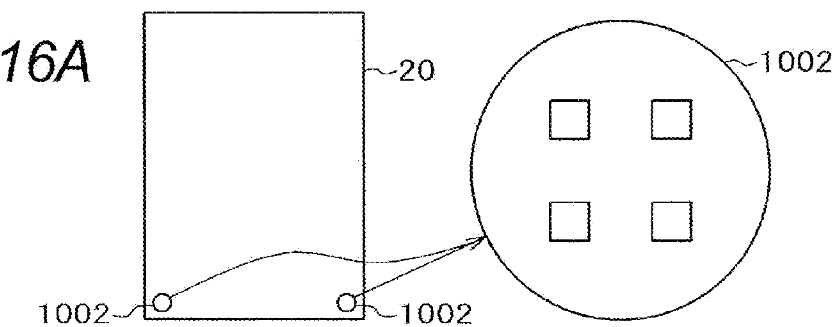
FIGS. 16A to 16C are detailed diagrams of alignment marks according to the conventional example.
Figure 16B:
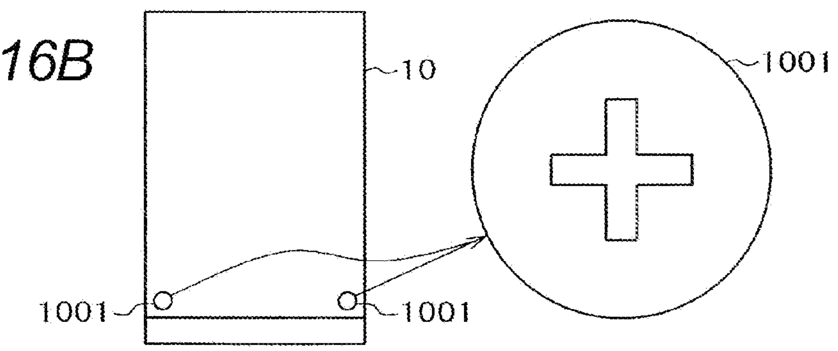

FIG. 8A is a barrier substrate alignment mark for the liquid crystal parallax barrier panel. The shape is not described because description is made in FIG. 16A. The point different from the alignment mark FIG. 16A is in that only a single alignment mark is formed at the lower right in FIG. 8A. FIG. 8B is an alignment mark pattern on the TFT substrate of the liquid crystal display panel. The alignment mark has a cross shape.

Figure 16C:
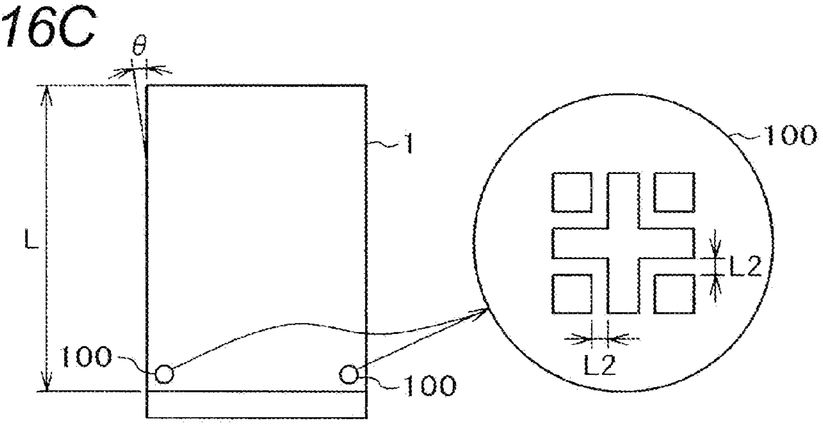
Figure 17:
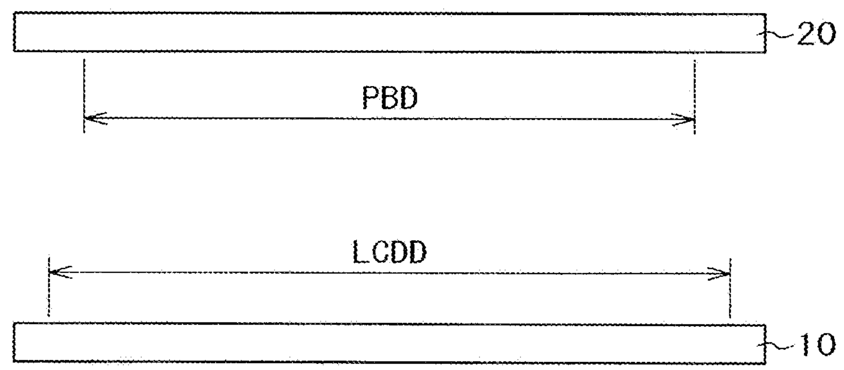
FIG. 17 is a schematic cross sectional diagram of the relationship between the display region of a liquid crystal display panel and the barrier electrode forming region of a parallax barrier panel according to the conventional example.

FIG. 8C is the state of an alignment mark in which the alignment of the liquid crystal display panel with the liquid crystal parallax barrier panel is completed. The form of the alignment mark in this state is the same as the alignment mark in FIG. 16C. Namely, a gap L2 between the cross alignment mark formed on the TFT substrate and the quadrilaterals of the quadrilateral alignment marks formed on the barrier substrate is a certain value, and then alignment is completed. In this connection, the accuracy of the gap L2 between the cross alignment mark and the quadrilaterals of the quadrilateral alignment marks is ±0.015 mm in the alignment mark. However, since accuracy of ±0.015 mm is not enough, the target accuracy is ±0.007 mm, which has not been actually achieved yet. It is noted that it is necessary that the gap L2 is smaller than a lateral dimension L1 of the sub-pixel in FIG. 9.

Conventionally, the liquid crystal display panel is aligned with the liquid crystal parallax barrier panel using only alignment marks. Thus, the shapes of the alignment marks have to be accurately read for improving alignment accuracy. Namely, the gap between the TFT substrate alignment mark and the barrier substrate alignment mark exists by about 0.53 mm in the vertical direction. When the gap is imaged using a single camera, the alignment marks blur in relation to the depth of focus, and it is sometimes difficult to achieve accurate alignment. In this case, two cameras are necessary for the TFT substrate alignment mark and the parallax barrier alignment mark. Conventionally, since two alignment marks exist on the right and the left of the substrate, four cameras are necessary.

On the contrary, in the present invention, the alignment mark is used for rough alignment for the first time, so that a predetermined alignment process can be performed even though the alignment mark is not clearly seen because of the influence of the depth of focus in the case of using only a single camera. Namely, the direction in which accuracy is necessary for the parallax barrier is the lateral direction of the pixel or the parallax barrier, that is, the relationship in the x direction. Alignment in the lateral direction can be accurately achieved by the relationship between the barrier pattern and the picture element or the pixel in the screen center part as illustrated in FIG. 6 or FIG. 7.

After aligning the liquid crystal display panel with the liquid crystal parallax barrier panel using the alignment mark, alignment in the x direction and alignment in the θ direction can be accurately achieved in the screen center part according to the present invention.

On the other hand, the liquid crystal display panel is aligned with the liquid crystal parallax barrier panel in the y direction by first alignment using the alignment mark. However, in the parallax barrier method, the alignment of the liquid crystal display panel with the liquid crystal parallax barrier panel in the y direction is less important than alignment in the x direction and alignment in the θ direction. Therefore, the alignment of the liquid crystal display panel with the liquid crystal parallax barrier panel in the y direction according to the embodiment can be achieved by just one-time alignment using the alignment mark.

As described above, according to the embodiment, the parallax barrier is used to align the liquid crystal display panel with the liquid crystal parallax barrier panel in the center of the screen, so that it is possible to particularly achieve alignment in the extending direction and alignment in the right angle direction of the barrier pattern, that is, it is possible to accurately achieve alignment in the x direction and alignment in the θ direction in FIG. 7, and it is possible to prevent the occurrence of moiré or the like on the screen. Moreover, alignment in the x direction can be accurately achieved, so that it is unnecessary to provide the display region of the liquid crystal display panel larger than the parallax barrier forming region of the liquid crystal parallax barrier panel. Furthermore, alignment work for the alignment mark can be performed using a single alignment mark with a single camera, so that it is possible to reduce the costs of devices for bonding the liquid crystal display panel to the liquid crystal parallax barrier panel using the alignment mark.

Second Embodiment

The parallax barrier method is a method of obtaining a three-dimensional image using the parallax between the right eye and the left eye. Therefore, it is necessary to form the stripe barrier in the vertical direction of the screen. However, in a small-sized display device, seeing the screen as the screen is put laterally or vertically is possible. In this case, it is difficult that a parallax barrier having only a vertical barrier pattern 50 meets a three-dimensional image in the case where the orientation of the screen is changed.

Figure 10:
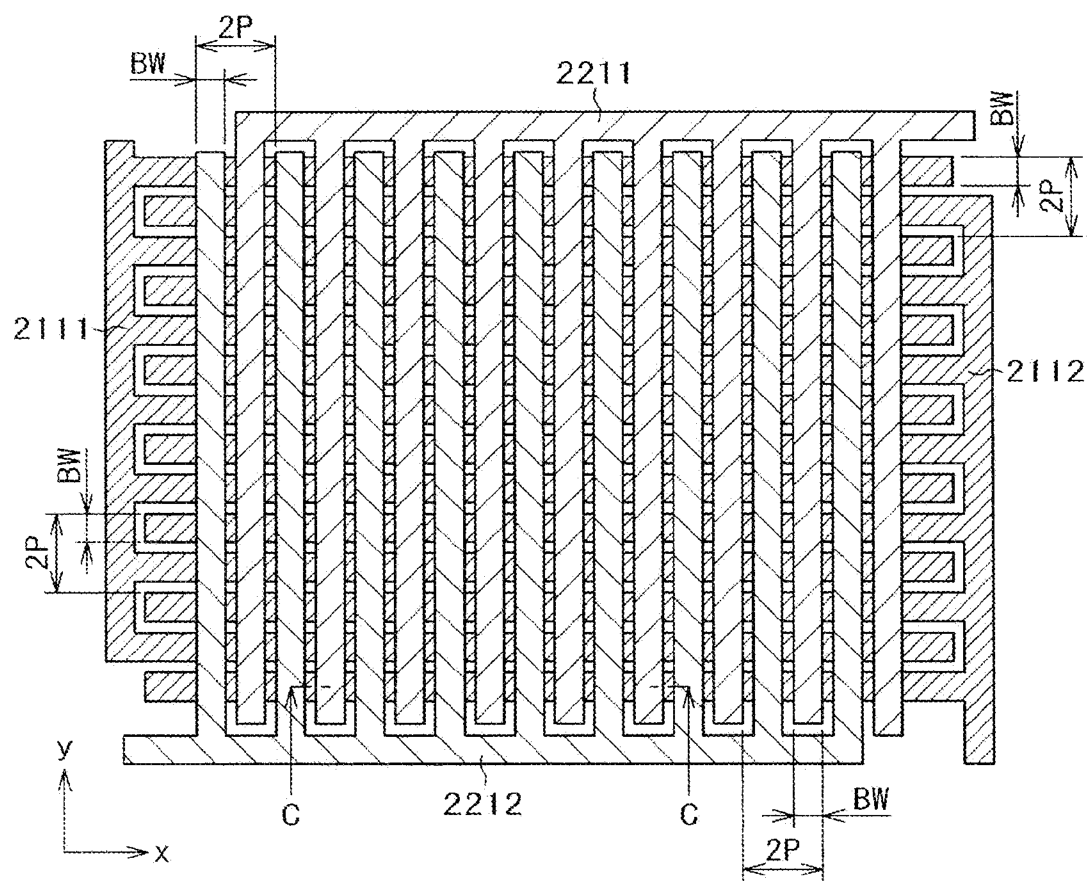
FIG. 10 is a plan view of the relationship between a barrier electrode and a counter electrode of a liquid crystal parallax barrier panel according to a second embodiment.

On the contrary, the shapes of a barrier electrode 221 and a counter electrode 211 are formed in shapes as illustrated in FIG. 10, so that three-dimensional images according to the parallax barrier method can be obtained even though the screen is used vertically or laterally. FIG. 10 is a plan view of the shapes and arrangement of the barrier electrode 221 and the counter electrode 211 according to the embodiment.

Figure 11:
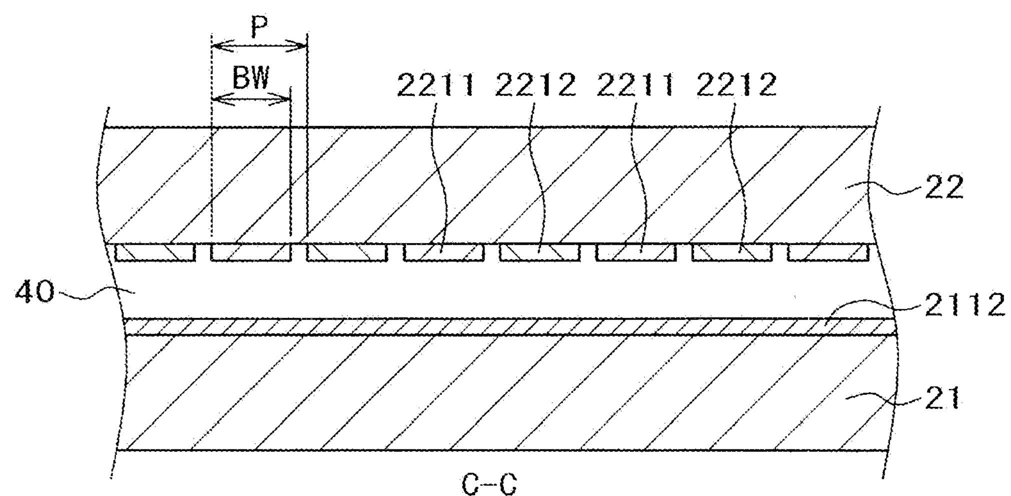
FIG. 11 is a cross sectional view along a line C-C in FIG. 10.

In FIG. 10, a first counter electrode 2111 and a second counter electrode 2112 in stripes extend in the lateral direction as faced to each other. Moreover, a first barrier electrode 2211 and a second barrier electrode 2212 in stripes extend in the vertical direction as faced to each other. FIG. 11 is a cross sectional view along a line C-C in FIG. 10. FIG. 11 is a diagram that only a barrier substrate 22 and a counter substrate 21 are extracted.

As illustrated in FIGS. 10 and 11, the first counter electrode 2111 and the second counter electrode 2112 are formed on the counter substrate 21, and the first barrier electrode 2211 and the second barrier electrode 2212 are formed on the barrier substrate 22. In FIG. 10, when a voltage is applied across the first counter electrode 2111 and three other electrodes, a lateral stripe barrier pattern 50 is formed. Moreover, when a voltage is applied across the second counter electrode 2112 and three other electrodes, a lateral stripe barrier pattern 50 is also formed. This configuration is used in the case where a three-dimensional image is displayed as the screen is put vertically. In this case, the gap between the barrier electrode and the counter electrode is much smaller than the gap between the first barrier electrode 2211 and the second barrier electrode 2212 or the gap between the first counter electrode 2111 and the second counter electrode 2112. Therefore, the strength of a lateral electric field generated between the first barrier electrode 2211 and the second barrier electrode 2212 or between the first counter electrode 2111 and the second counter electrode 2112 is considerably smaller than the strength of a vertical electric field generated between the barrier electrodes and the counter electrode. Thus, the lateral electric field can be ignored.

In FIG. 11, when a voltage is applied across the first barrier electrode 2211 and three other electrodes, a vertical stripe barrier pattern 50 is formed. Moreover, when a voltage is applied across the second barrier electrode 2212 and three other electrodes, a vertical stripe barrier pattern 50 is also formed. This configuration is used in the case where a three-dimensional image is displayed as the screen is put laterally in general. Also in this case, in the relationship between the strength of the lateral electric field and the strength of the vertical electric field as described above, the strength of the vertical electric field is much greater than the strength of the lateral electric field.

In FIG. 10, the pitch of the barrier electrode 221 is 2P, which is the same as twice the pitch of a pixel 70. In FIG. 10, the width BW of the first barrier electrode 2211 and the width BW of the second barrier electrode 2212 are depicted smaller than the width P of a pixel electrode. When it is feasible on design, in order to exert the effect of the parallax barrier more effectively, desirably, the width BW of the barrier electrode is the same as the pitch of the pixel. The same thing is applied to the relationship between the width BW of the first counter electrode, the width BW of the second counter electrode, and the pitch of the pixel in FIG. 10.

In the case where a three-dimensional image is formed as the screen is put vertically, the barrier pattern is formed with the first counter electrode 2111 or the second counter electrode 2112. The operation in this case is the same as the case where the barrier pattern is formed with the first barrier electrode 2211 or the second barrier electrode 2212 when the screen is put laterally, and the description is omitted.

FIG. 11 is a cross sectional view along a line C-C in FIG. 10, in which the first barrier electrode 2211 and the second barrier electrode 2212 are arranged side by side on the barrier substrate 22. When a voltage is applied across the first barrier electrode 2211 and other electrodes, a barrier pattern 50 is formed with the first barrier electrode 2211. However, since no voltage is applied across the second barrier electrode 2212, the first counter electrode 2111, and the second counter electrode 2112, light is transmitted. Therefore, a stripe barrier pattern 50 is generated. Similarly, when a voltage is applied across the second barrier electrode 2212 and other electrodes, a barrier pattern 50 is formed with the second barrier electrode 2212.

In FIG. 11, since the first barrier electrode 2211 and the second barrier electrode 2212 are alternately disposed, the pitch of the first barrier electrode 2211 and the pitch of the second barrier electrode 2212 are P, which is the same as the pitch of the pixel 70. Of course, the first barrier electrode 2211 is electrically insulated from the second barrier electrode 2212.

In the case of forming a lateral barrier pattern 50, the stripe counter electrode 211 alternately appears on the counter substrate 21, and a voltage is applied across the counter electrode 211 and the barrier electrode 221 to form the lateral barrier pattern 50 in FIG. 11. The relationship between the first counter electrode 2111 and the second counter electrode 2112 on the counter substrate 21 and the relationship between the first barrier electrode 2211 and the second barrier electrode 2212 on the barrier substrate 22 are omitted in the description, because rotation is made at an angle of 90 degrees in the relationship in the case in FIG. 7.

In the description above, the description is made in which the pitch of the pixel is P also in the lateral direction and the vertical direction. However, the pitch of the pixel is not necessarily the same in the lateral direction and the vertical direction.

FIG. 12 is a plan view of a three-dimensional display device according to the embodiment. The point different from the point in FIG. 1 is in that there are no alignment marks. Namely, as described later, in the embodiment, the liquid crystal display panel can be accurately bonded to the liquid crystal parallax barrier panel with no use of alignment marks.

Figure 13:
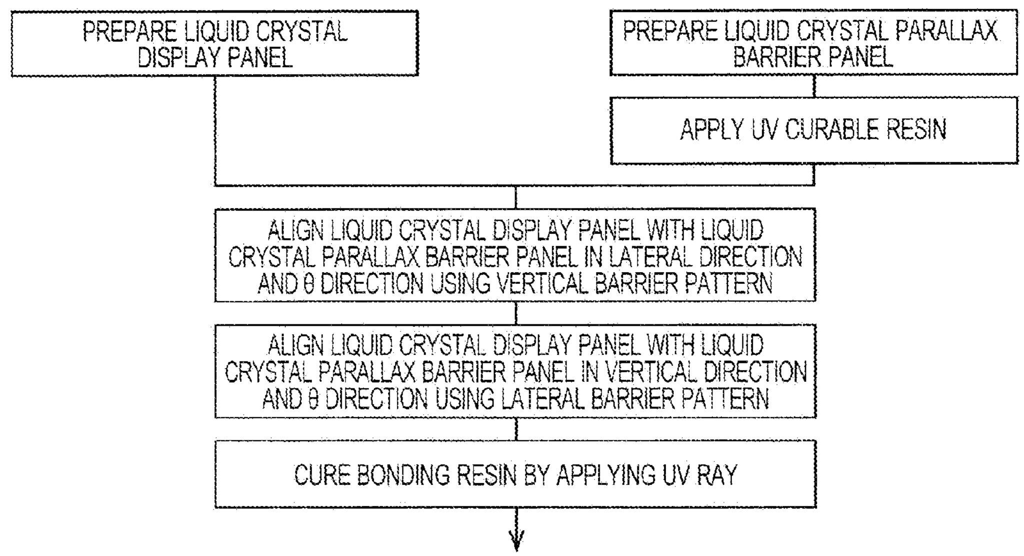
FIG. 13 is a flowchart of the process step of bonding a liquid crystal display panel to a liquid crystal parallax barrier panel according to the second embodiment.

FIG. 13 is a flowchart of the manufacturing process steps of bonding the liquid crystal display panel to the liquid crystal parallax barrier panel according to the embodiment. In FIG. 13, the following is the same as in FIG. 3 in which the liquid crystal display panel and the liquid crystal parallax barrier panel are prepared separately, and a UV curable resin is applied on the lower surface of the liquid crystal parallax barrier panel. In FIG. 13, the vertical parallax barrier, the first parallax barrier or the second parallax barrier in FIG. 10 is used to form a white pattern in vertical stripes for two pixels as described in the first embodiment. Thus, as described in the first embodiment, the liquid crystal display panel is aligned with the liquid crystal parallax barrier panel in the x direction and the θ direction. The alignment of the liquid crystal display panel with the liquid crystal parallax barrier panel according to this method can be accurately achieved as described in the first embodiment.

Subsequently, the screen is rotated at an angle of 90 degrees, and the first counter electrode or the second counter electrode is used to form a stripe white pattern for two pixels in the screen center part. Thus, as described in the first embodiment, the liquid crystal display panel is aligned with the liquid crystal parallax barrier panel in a direction 90 degrees minus θ and the y direction (since the screen is rotated at an angle of 90 degrees from FIG. 10 when evaluated, alignment is achieved in the x direction and the θ direction). The liquid crystal display panel can be accurately aligned with the liquid crystal parallax barrier panel according to this method. After the alignment, UV rays are applied to cure the UV curable resin, the liquid crystal display panel is bonded to the liquid crystal parallax barrier panel, and then the three-dimensional display device is completed.

According to the embodiment, it is possible to bond the liquid crystal display panel to the liquid crystal parallax barrier panel as the positions in the x direction, the y direction, and the θ direction are accurately aligned with no use of alignment marks, in bonding the panels to each other. Moreover, it is unnecessary to use bonding devices for the liquid crystal display panel and the liquid crystal parallax barrier panel using alignment marks, so that it is possible to reduce the costs of manufacturing facilities.

What is claimed is:

1. A manufacturing method of a three-dimensional display device in which a liquid crystal parallax barrier panel is stacked on a display region liquid crystal display panel, the display region liquid crystal display panel having a pixel formed of three sub-pixels arranged in a lateral direction of a screen at a pixel pitch P, and the liquid crystal parallax barrier panel sandwiching liquid crystals between a barrier substrate formed with a barrier electrode and a counter substrate formed with a counter electrode, the method comprising the steps of:

aligning the liquid crystal display panel with the liquid crystal parallax barrier panel using an alignment mark formed on the liquid crystal display panel and an alignment mark formed on the liquid crystal parallax barrier panel as a first step;

aligning the liquid crystal display panel with the liquid crystal parallax barrier panel as a second step in which a signal forming a white pattern in a width of two pixels on the liquid crystal display panel is inputted, at a location at which the white pattern has a color pattern having a color different from a color of a center white pattern or black pattern and a white pattern is formed on both sides of the color pattern different from the white pattern or black pattern in bringing an observer's eyes close to the screen, according to relationship between a width d1 of the color pattern different from the white pattern or black pattern and a width d2 of the white pattern formed on the both sides of the width of the color pattern different from the white pattern or black pattern and a tilt of the color pattern different from the white pattern or black pattern with respect to the screen; and after the alignment of the second step, finally fixing the liquid crystal display panel to the liquid crystal parallax barrier panel.

2. The manufacturing method of a three-dimensional display device according to claim 1, wherein there is only one alignment mark for the alignment mark in a three-dimensional display device.

3. The manufacturing method of a three-dimensional display device according to claim 2, wherein there is only one camera to detect the alignment mark.

4. The manufacturing method of a three-dimensional display device according to claim 1, wherein the relationship between the width d1 of the color pattern different from the white pattern or black pattern and the width d2 of the white pattern formed on the both sides of the color pattern different from the white pattern or black pattern is d1=2d2.

5. The manufacturing method of a three-dimensional display device according to claim 1, wherein the color of the color pattern different from the white pattern or black pattern is blue.

6. The manufacturing method of a three-dimensional display device according claim 1, wherein the liquid crystal display panel is bonded to the liquid crystal parallax barrier panel using a UV curable resin.

7. A manufacturing method of a three-dimensional display device in which a liquid crystal parallax barrier panel is stacked on a display region liquid crystal display panel, the display region liquid crystal display panel having a pixel formed of three sub-pixels in a lateral direction of a screen at a pixel pitch P, the liquid crystal parallax barrier panel sandwiching liquid crystals between a barrier substrate formed with a barrier electrode and a counter substrate formed with a counter electrode, and the three-dimensional display device enabling vertical display in which the screen is put in a first direction and lateral display in which the screen is put in a second direction, the method comprising the steps of:

forming an electrode for putting the screen in the first direction and an electrode for putting the screen in the second direction on the liquid crystal parallax barrier panel;

aligning the liquid crystal display panel with the liquid crystal parallax barrier panel as a first step in which a signal forming a white pattern in a width of two pixels on the liquid crystal display panel is inputted in the first direction in which the screen is put, at a location at which the white pattern has a first color pattern having a color different from a color of a center white pattern or black pattern and a first white pattern is formed on both sides of the first color pattern different from the white pattern or black pattern in bringing an observer's eyes close to the screen, according to relationship between a width d1 of the first color pattern different from the white pattern or black pattern and a width d2 of the first white pattern formed on the both sides of the first color pattern different from the white pattern or black pattern and a tilt of the first color pattern different from the white pattern or black pattern with respect to the screen;

aligning the liquid crystal display panel with the liquid crystal parallax barrier panel as a second step in which a signal forming a white pattern in a width of two pixels on the liquid crystal display panel is inputted in the second direction, at a location at which the white pattern has a second color pattern having a color different from a color of a center white pattern or black pattern and a second white pattern formed on both sides of the second color pattern different from the white pattern or black pattern is formed in bringing an observer's eyes close to a screen, according to relationship between a width d3 of the second color pattern different from the white pattern or black pattern and a width d4 of the second white pattern formed on the both sides of the second color pattern different from the white pattern or black pattern and a tilt of the second color pattern different from the white pattern or black pattern with respect to the screen; and after the alignment of the second step, finally fixing the liquid crystal display panel to the liquid crystal parallax barrier panel.

8. The manufacturing method of a three-dimensional display device according to claim 7, wherein the relationship between the width d1 of the first color pattern different from the white pattern or black pattern and the width d2 of the first white pattern formed on the both sides of the first color pattern different from the white pattern or black pattern is d1=2d2; and wherein the relationship between the width d3 of the second color pattern different from the white pattern or black pattern and the width d4 of the second white pattern formed on the both sides of the second color pattern different from the white pattern or black pattern is d3=2d4.

9. The manufacturing method of a three-dimensional display device according to claim 7, wherein the color of the first color pattern different from the white pattern or black pattern is blue; and wherein the color of the second color pattern different from the white pattern or black pattern is blue.

* * * * *